(12) United States Patent
Lorieau

(10) Patent No.: US 6,285,870 B1
(45) Date of Patent: *Sep. 4, 2001

(54) TELEPHONY DEVICE COMPRISING A BASE STATION AND AT LEAST ONE HANDSET, SUBSCRIPTION METHOD OF A HANDSET, HANDSET AND BASE STATION SUITABLE FOR SUCH A DEVICE

(75) Inventor: Christophe Lorieau, Guecelard (FR)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/150,571

(22) Filed: Sep. 10, 1998

(30) Foreign Application Priority Data

Sep. 10, 1997 (FR) .................................................. 97 11239

(51) Int. Cl.[7] ........................................ H04Q 7/20
(52) U.S. Cl. ........................ 455/411; 455/410; 455/465; 380/247
(58) Field of Search ................................... 455/410, 411, 455/462, 465; 380/247, 249, 270, 42

(56) References Cited

U.S. PATENT DOCUMENTS

| | | | |
|---|---|---|---|
| 5,307,370 | * | 4/1994 | Eness .................... 455/462 |
| 5,384,847 | * | 1/1995 | Hendrickson et al. ........... 455/411 X |
| 5,448,764 | * | 9/1995 | Sondermann et al. ................. 455/88 |
| 5,513,245 | | 4/1996 | Miziikovsky et al. ................ 455/410 |
| 5,631,927 | * | 5/1997 | Caia et al. ............................ 375/260 |
| 5,765,197 | * | 6/1998 | Combs .................................... 380/42 |
| 5,812,948 | * | 9/1998 | Hjern et al. .......................... 455/435 |
| 5,864,757 | * | 1/1999 | Parker .................................. 455/418 |
| 5,915,021 | * | 6/1999 | Herlin et al. ..................... 380/247 X |
| 5,943,615 | * | 8/1999 | Rose et al. .......................... 455/411 |
| 5,995,842 | * | 11/1999 | Jonsson ................................ 455/462 |

FOREIGN PATENT DOCUMENTS

| | | | |
|---|---|---|---|
| 0506637A2 | 9/1992 | (EP) | ................. H04Q/7/04 |
| 0584725A1 | 3/1994 | (EP) | ................. H04Q/7/00 |
| 0652681A2 | 5/1995 | (EP) | ................. H04Q/7/32 |
| 0673178A2 | 9/1995 | (EP) | ................. H04Q/7/38 |
| 0717578A2 | 6/1996 | (EP) | ................. H04Q/7/38 |
| 0796876A2 | 7/1997 | (EP) | ................. H04B/7/26 |
| WO9613920 | 5/1996 | (WO) | ................. H04L/9/32 |
| WO9715161 | 4/1997 | (WO) | ................. H04Q/7/38 |

* cited by examiner

Primary Examiner—Nay Maung
(74) Attorney, Agent, or Firm—Dicran Halajian

(57) ABSTRACT

A telephony device includes a wireless handset having a memory and a processor; and a base station having a connection to a telephone line and a transceiver for communicating with the wireless handset. The processor encrypts data to form encrypted data prior to storage in the handset memory, and stores the encrypted data in the handset memory. Further, the processor reads the encrypted data from the handset memory and decrypts the encrypted data for further use.

18 Claims, 2 Drawing Sheets

TELEPHONY DEVICE COMPRISING A BASE STATION AND AT LEAST ONE HANDSET, SUBSCRIPTION METHOD OF A HANDSET, HANDSET AND BASE STATION SUITABLE FOR SUCH A DEVICE

FIELD OF THE INVENTION

The invention relates to a telephony device comprising a base station which has a connection to a telephone line and a transceiver assembly for communicating with at least one handset from which handset the user may engage in a telephone communication, the system comprising subscription means for validating a handset with the base station by means of subscription data.

The invention relates to a handset and a base station suitable for such a device.

The invention also relates to a subscription method of a handset.

The invention finds interesting applications in the telephony devices satisfying the DECT standard. The invention is also interesting for the standards which imply steps recalling those of said standard and which make use of subscription data.

BACKGROUND OF THE INVENTION

The problem which is posed with this type of system is that during this subscription of a handset to a base station this base station broadcasts subscription data so that it is possible to recover them. These data may thus be copied to another handset which handset is not authorized. This thus forms a considerably fraudulent cause.

SUMMARY OF THE INVENTION

The present invention proposes a device of the type described in the opening paragraph which provides a good invulnerability to fraudulent subscriptions of handsets.

Therefore, such a device is characterized in that it comprises encryption means for encrypting said subscription data.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
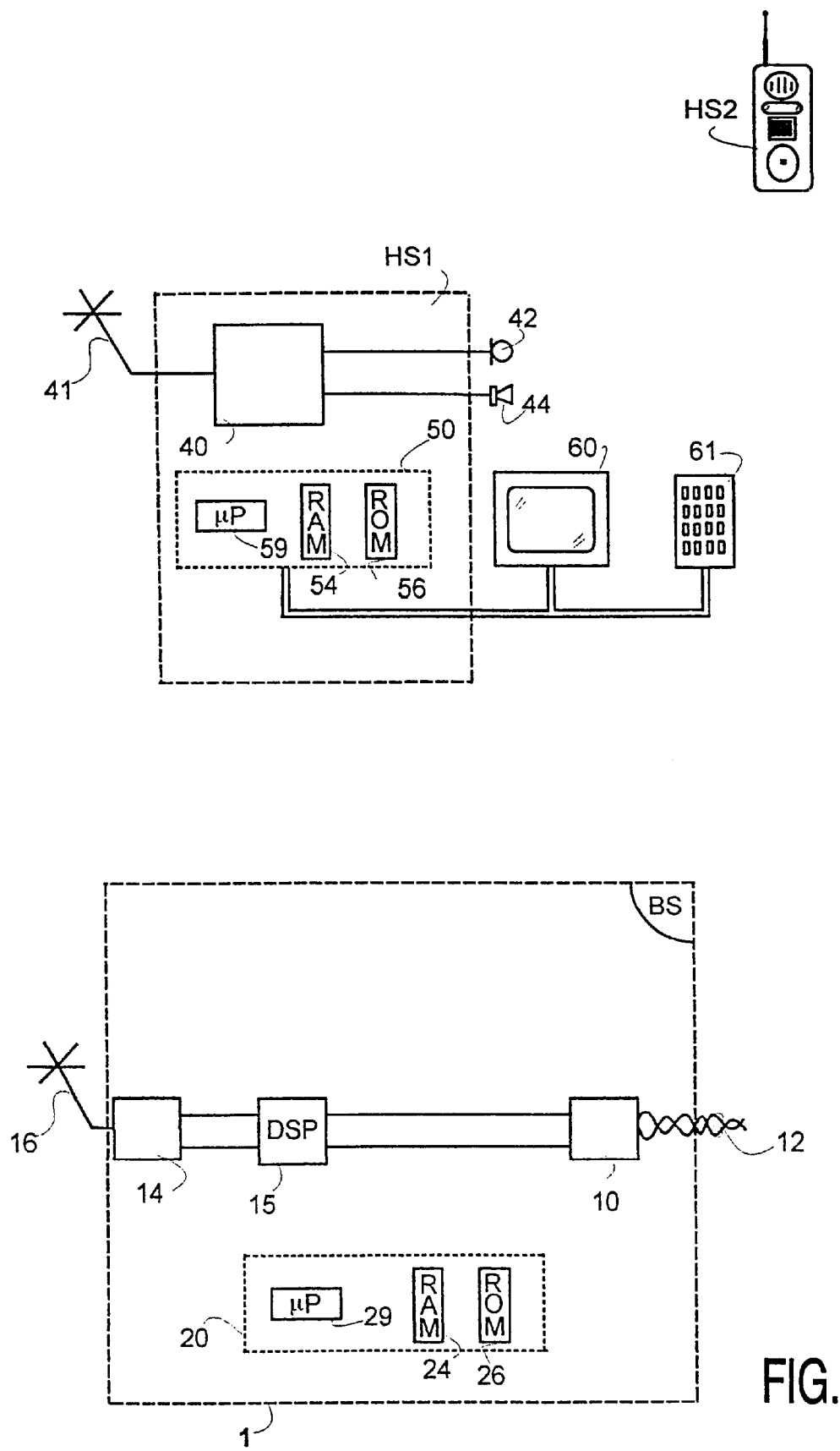
FIG. 1 shows a telephony device according to the invention.

In FIG. 1 the device which is represented is a device satisfying the DECT standards. Reference 1 shows the base station BS to which may be connected by radio a plurality of handsets HS1, HS2, . . . . This base station 1 comprises, inter alia, a line circuit 10 which makes it possible for the base station to be connected to the switched network by a telephone line 12 and a radio circuit 14 which authorizes the dialogue with the various handsets HS1, HS2, . . . by transmitting and receiving waves through an antenna 16. For processing all the data of analog type which pass through the basic circuit, a signal processing element 15 is provided formed around a signal processor DSP which notably processes the speech signals so as to transform them into digital signals.

All the elements of this basic circuit 1 are managed by a microprocessor assembly 20. This element is formed notably in usual fashion by a random access memory 24, a read-only memory 26 containing the operating instructions of the device and a management processor 29.

The handset HS1, the only one shown in detail (the handset HS2 may have an identical structure) comprises a communication assembly 40 which has an antenna 41 which makes it possible for the handset to communicate with the base station BS and from there with the other handsets HS2, . . . . This assembly processes the data coming from the microphone 42 and also produces the signals for a loudspeaker 44. Also provided is a management element 50 formed just like the management element 20 by a random access memory 54, a read-only memory 56 containing the operating instructions of the device and a management processor 59. The memory 56 may be an EEPROM memory or a flash memory. The handset HS1 also comprises a display 60 on which various data are shown and a keyboard 61. These handsets are mobiles and are therefore supplied with power by an accumulator not shown in FIG. 1.

When a handset has been subscribed to a base station, it saves three data which are stored in the memory 56:

the data RFPI (cf. ETSI standards ETS 175-6) which is the identifier of the base station to which the handset is subscribed (provided by the base station during subscription), the data UAK (see ETSI standards ETS 175-5) which is an authentication key (also provided by the base station during subscription), the data IPUI (see ETSI standards ETS 175-6) which is its own identifier and which it has supplied to the base station during subscription.

This is summarized by the following Table:

| useful data | stored data |
| --- | --- |
| IPUI | IPUI |
| UAK | UAK |
| RFPI | RFPI |

If these data are copied from a first handset to a second handset, then this second handset has become a clone of the first handset. The second handset has thus inherited all the possibilities of the first handset.

To avoid this according to the invention, said data are stored in encrypted form in the memory 56.

| useful data | stored data |
| --- | --- |
| IPUI | f (IPUI, x) |
| UAK | f (UAK, x) |
| RFPI | f (RFPI, x) | where f( ) is a reversible function and x is a specific code for each handset which is programmed during manufacture.

According to a preferred embodiment, this function f is defined in the following manner:

f(id,x) with id=IPUI (100 bits)

or UAK (128 bits)

or RFPI (40 bits)

and x is an octet programmed as OTP (during manufacture). The function f is thus:

for id=IPUI or UAK f( )=exchange of the high and low nibbles in each octet after which x bits shifted modulo-32, and for id=RFPI f'( )=exchange of the high and low nibbles in each octet.

Figure 2:
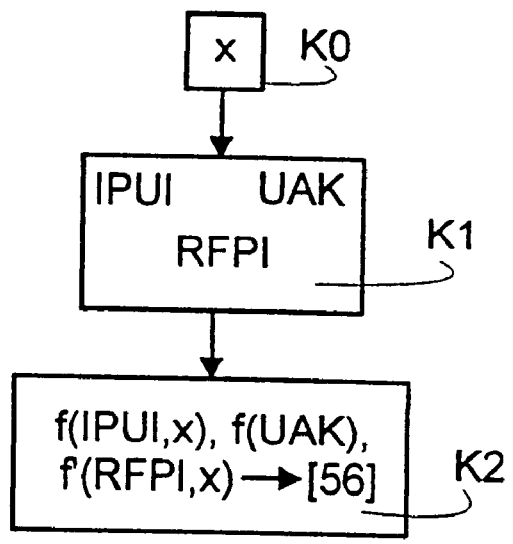
FIG. 2 is a flow chart showing how the data are encrypted.
Figure 3:
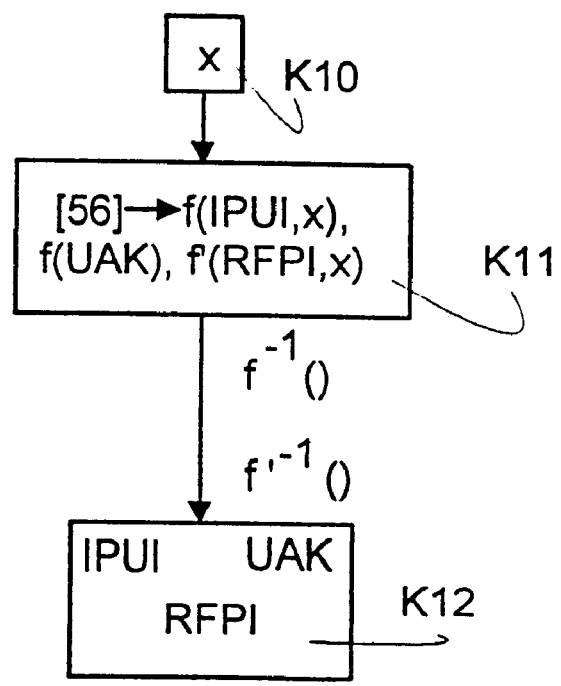
FIG. 3 is a flow chart showing how the data are restored.

FIGS. 2 and 3 show the method which is implemented in the device according to the invention.

In FIG. 2 which relates to locating the protected data, the reference K0 indicates that an octet x already written in the memory is rendered available for that which comes after the implementation of the method. Box K1 represents the data which have just been encrypted and box K2 shows that the data encrypted by the functions f( ) and f'( ) are written in the memory 56.

FIG. 3 shows how these encrypted data are used. Box K10 indicates the number of available octets x. Then the encrypted data are extracted from the memory 56, box K11, and before being rendered available to box K12 they are subjected to the inverse transformation $f^{-1}$ and $f'^{-1}$. Thanks to the presence of the number x which is assigned to each of the handsets, another handset will not be able to use the subscription data.

The function f or f' described may be replaced by any other reversible function without leaving the scope of the invention. For example, a DES encryption may also be used.

What is claimed is:

1. A telephony device comprising:

a wireless handset having a memory and a processor; and a base station having a connection to a telephone line and a transceiver for communicating with the wireless handset;

wherein said processor encrypts data to form encrypted data prior to storage in said memory, and stores said encrypted data in said memory; and wherein said processor encrypts said data using a reversible function, said reversible function exchanging high and low nibbles in each octet of said data.

2. The telephony device of claim 1, wherein said processor reads said encrypted data from said memory and decrypts said encrypted data to form said data.

3. The telephony device of claim 1, wherein said data include at least one of a base identifier of said base station provided by said base station during subscription, an authentication key provided by said base station during said subscription, and a handset identifier of said handset.

4. The telephony device of claim 1, wherein said data include a base identifier of said base station, an authentication key, and a handset identifier of said handset.

5. The telephony device of claim 1, wherein said processor encrypts said data using a handset code which is programmed during manufacture of said handset.

6. The telephony device of claim 5, wherein said octet is included in said handset code programmed during said manufacture of said handset.

7. The telephony device of claim 5, wherein said reversible function exchanges said high and low nibbles in said each octet of said data to form exchanged data, and shifts said exchanged data by bits of said octet which is included in said handset code programmed during said manufacture of said handset.

8. A wireless handset for communicating with a base station comprising:

a memory and a processor;

wherein said processor encrypts data to form encrypted data prior to storage in said memory, and stores said encrypted data in said memory; and wherein said processor encrypts said data using a reversible function, said reversible function exchanging high and low nibbles in each octet of said data.

9. The wireless handset of claim 8, wherein said processor reads said encrypted data from said memory and decrypts said encrypted data to form said data.

10. The wireless handset of claim 8, wherein said data include at least one of a base identifier of said base station provided by said base station during subscription, an authentication key provided by said base station during said subscription, and a handset identifier of said handset.

11. The wireless handset of claim 8, wherein said data include a base identifier of said base station, an authentication key, and a handset identifier of said handset.

12. The wireless handset of claim 8, wherein said processor encrypts said data using a handset code which is programmed during manufacture of said handset.

13. The wireless handset of claim 12, wherein said octet is included in said handset code programmed during said manufacture of said handset.

14. The wireless handset of claim 12, wherein said reversible function exchanges said high and low nibbles in said each octet of said data to form exchanged data, and shifts said exchanged data by bits of said octet which is included in said handset code programmed during said manufacture of said handset.

15. A method of securing data in a wireless handset comprising:

encrypting data to form encrypted data prior to storage in a memory of said handset;

storing said encrypted data in said memory;

wherein said encrypting act encrypts said data using a reversible function, said reversible function exchanging high and low nibbles in each octet of said data.

16. The method of claim 15, further comprising: reading said encrypted data from said memory; and decrypting said encrypted data to form said data.

17. The method of claim 16, wherein said data is subscription data of said wireless handset to a base station.

18. The method of claim 15, wherein said encrypting act encrypts said data using a handset code which is programmed during manufacture of said handset.

* * * * *